(12) United States Patent
Yi et al.

(10) Patent No.: US 11,006,444 B2
(45) Date of Patent: May 11, 2021

(54) METHOD AND USER EQUIPMENT FOR RECEIVING DOWNLINK SIGNALS

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 15/861,574

(22) Filed: Jan. 3, 2018

(65) Prior Publication Data

US 2018/0192436 A1  Jul. 5, 2018

Related U.S. Application Data

(60) Provisional application No. 62/441,576, filed on Jan. 3, 2017.

(51) Int. Cl.

| | |
|---|---|
| *H04W 72/14* | (2009.01) |
| *H04W 68/00* | (2009.01) |
| *H04W 72/04* | (2009.01) |
| *H04W 72/12* | (2009.01) |
| *H04W 76/28* | (2018.01) |
| *H04W 76/27* | (2018.01) |

(52) U.S. Cl.
CPC ......... *H04W 72/14* (2013.01); *H04W 68/005* (2013.01); *H04W 72/0413* (2013.01); *H04W 72/1278* (2013.01); *H04W 72/042* (2013.01); *H04W 76/27* (2018.02); *H04W 76/28* (2018.02); *Y02D 30/70* (2020.08)

(58) Field of Classification Search
CPC ............ H04W 72/14; H04W 72/1278; H04W 72/0413; H04W 68/005; H04W 76/27; H04W 76/28; H04W 72/042
See application file for complete search history.

(56) References Cited

U.S. PATENT DOCUMENTS

| | | | | |
|---|---|---|---|---|
| 2014/0313993 | A1* | 10/2014 | Tabet | H04W 72/042 370/329 |
| 2014/0321371 | A1* | 10/2014 | Anderson | H04W 76/38 370/329 |
| 2017/0367058 | A1* | 12/2017 | Pelletier | H04W 56/0045 |
| 2018/0062699 | A1* | 3/2018 | Horiuchi | H04L 5/0053 |
| 2018/0242306 | A1* | 8/2018 | Wong | H04W 68/00 |

* cited by examiner

*Primary Examiner* — Alex Skripnikov
*Assistant Examiner* — Sharmin Chowdhury
(74) *Attorney, Agent, or Firm* — Lee, Hong, Degerman, Kang & Waimey

(57) ABSTRACT

In the present invention, a user equipment (UE) receives a paging message associated with downlink (DL) data. The UE transmits a paging feedback using a uplink (UL) grant associated with the paging message. The UE monitors a physical downlink control channel (PDCCH) to receive the DL data.

16 Claims, 10 Drawing Sheets

(a) Control-Plane Protocol Stack (b) User-Plane Protocol Stack

METHOD AND USER EQUIPMENT FOR RECEIVING DOWNLINK SIGNALS

CROSS-REFERENCE TO RELATED APPLICATIONS

Pursuant to 35 U.S.C. § 119(e), this application claims the benefit of U.S. Provisional Patent Application No. 62/441,576, filed on Jan. 3, 2017, the contents of which are hereby incorporated by reference herein in its entirety.

TECHNICAL FIELD

The present invention relates to a wireless communication system, and more particularly, to a method for receiving downlink signals and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

SUMMARY

In an aspect of the present invention, provided herein is a method of receiving, by a user equipment (UE), downlink signals in a wireless communication system. The method comprises: receiving, by the UE, a paging message associated with downlink (DL) data; transmitting, by the UE, a paging feedback using a uplink (UL) grant associated with the paging message; and monitoring, by the UE, a physical downlink control channel (PDCCH) to receive the DL data.

In another aspect of the present invention, provided herein is a user equipment (UE) for receiving downlink signals in a wireless communication system. The UE comprises a radio frequency (RF) unit, and a processor configured to control the RF unit. The processor is configured to: control the RF unit to receive a paging message associated with downlink (DL) data; control the RF unit to transmit a paging feedback using a uplink (UL) grant associated with the paging message; and monitor a physical downlink control channel (PDCCH) to receive the DL data.

In each aspect of the present invention, the UL grant may be included in the paging message, or pre-configured by system information.

In each aspect of the present invention, the UE may be in RRC_INACTIVE.

In each aspect of the present invention, the paging message may include a UE identity that the paging message targets for. The UE may transmit the paging feedback if the UE identity is the same as that of the UE.

In each aspect of the present invention, the paging feedback may be transmitted in a medium access control (MAC) control element.

In each aspect of the present invention, the UE may monitor the PDCCH addressed to a UE-dedicated radio network temporary identifier after transmitting the paging feedback.

In each aspect of the present invention, the UE may monitor the PDCCH addressed to the UE-dedicated RNTI using an inactive discontinuous reception (DRX) after transmitting the paging feedback.

In each aspect of the present invention, the UE may transmit the paging feedback without initiating a random access procedure In each aspect of the present invention, the UE may receive a physical downlink shared channel (PDSCH) associated with the PDCCH addressed to a UE-dedicated RNTI, where the PDSCH carries the DL data. The UE may monitor a further PDCCH addressed to the UE-dedicated RNTI if the PDSCH includes an indication that more DL data is waiting for transmission. The UE may go back to a paging DRX if the PDSCH includes an indication that no more DL data is waiting for transmission.

In each aspect of the present invention, the UE-dedicated RNTI may be a cell RNTI (C-RNTI).

In each aspect of the present invention, the paging message may include an indication that the paging message is for DL data transmission.

The above technical solutions are merely some parts of the embodiments of the present invention and various embodiments into which the technical features of the present invention are incorporated can be derived and understood by persons skilled in the art from the following detailed description of the present invention.

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount f data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
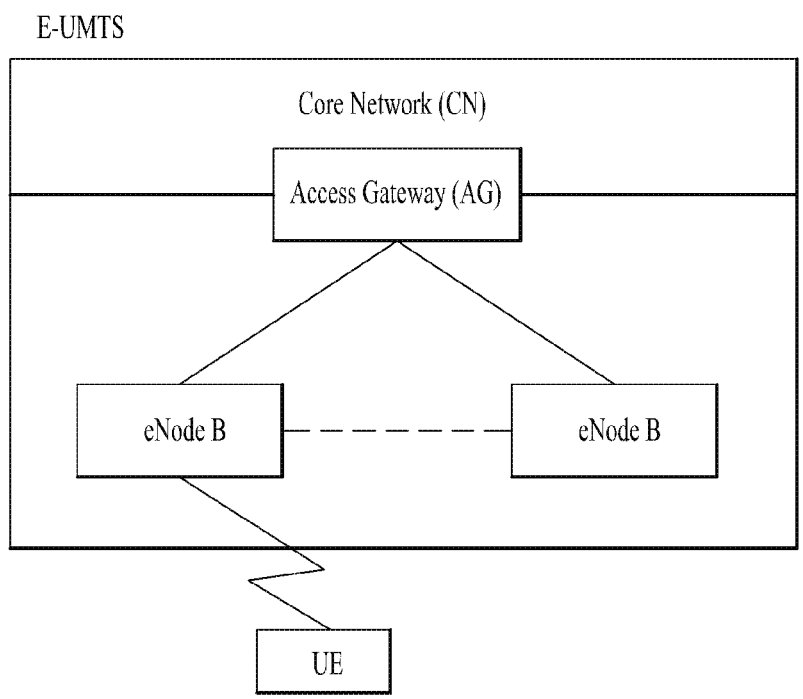
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
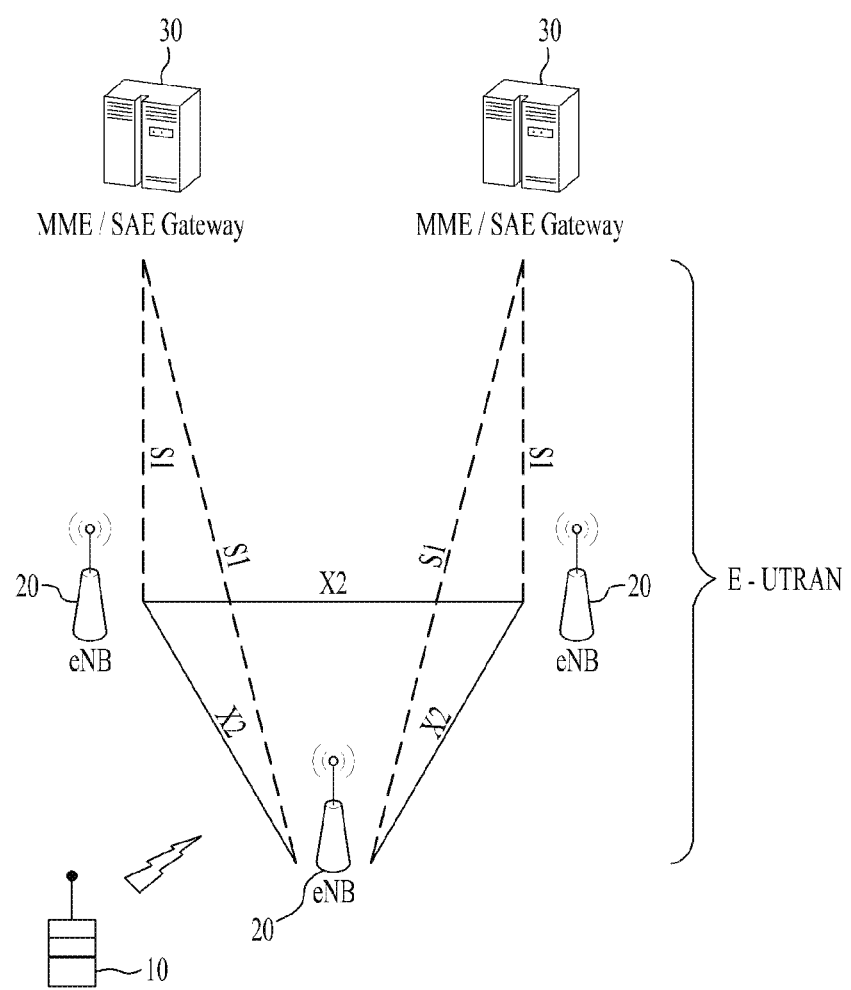
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
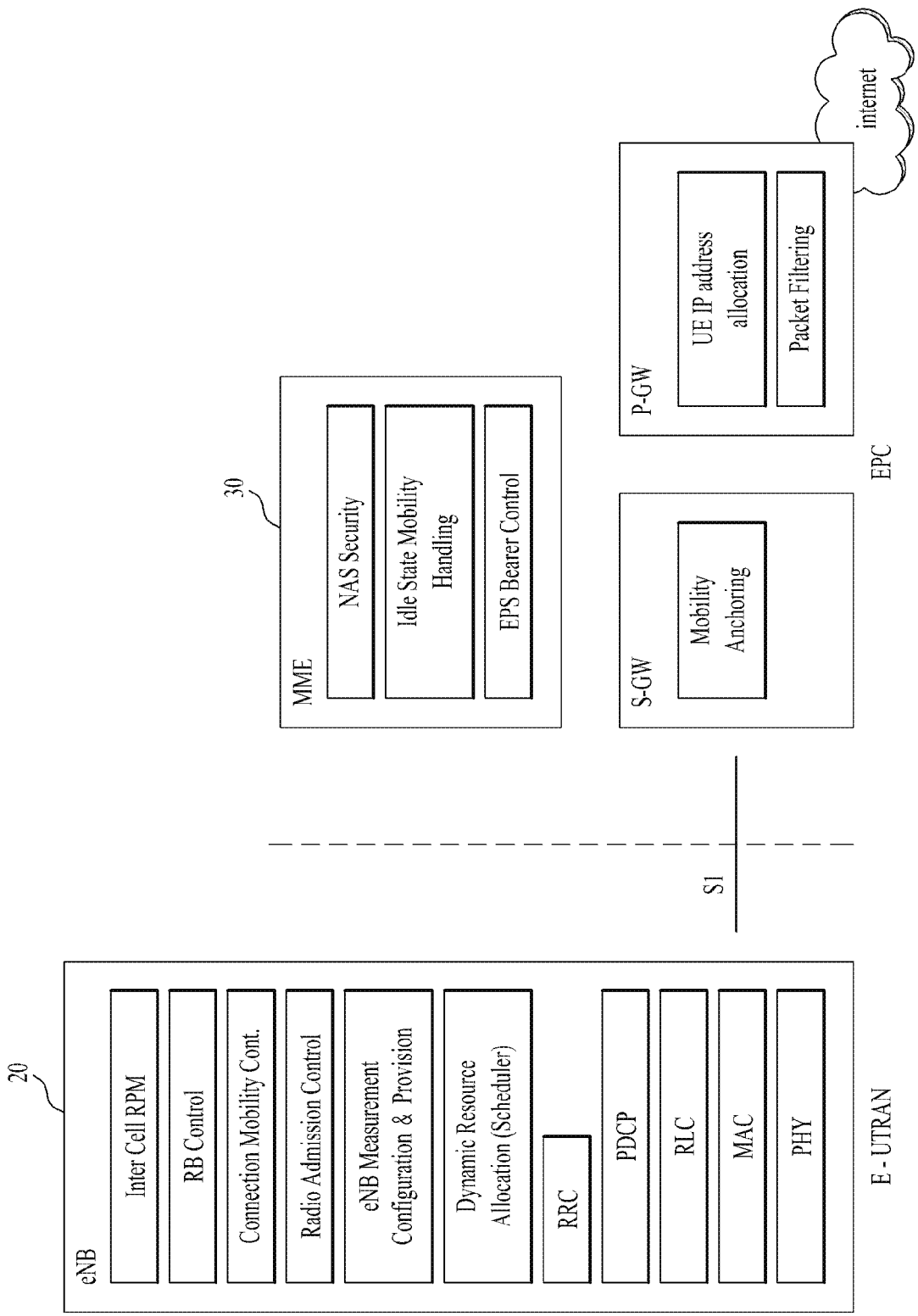
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
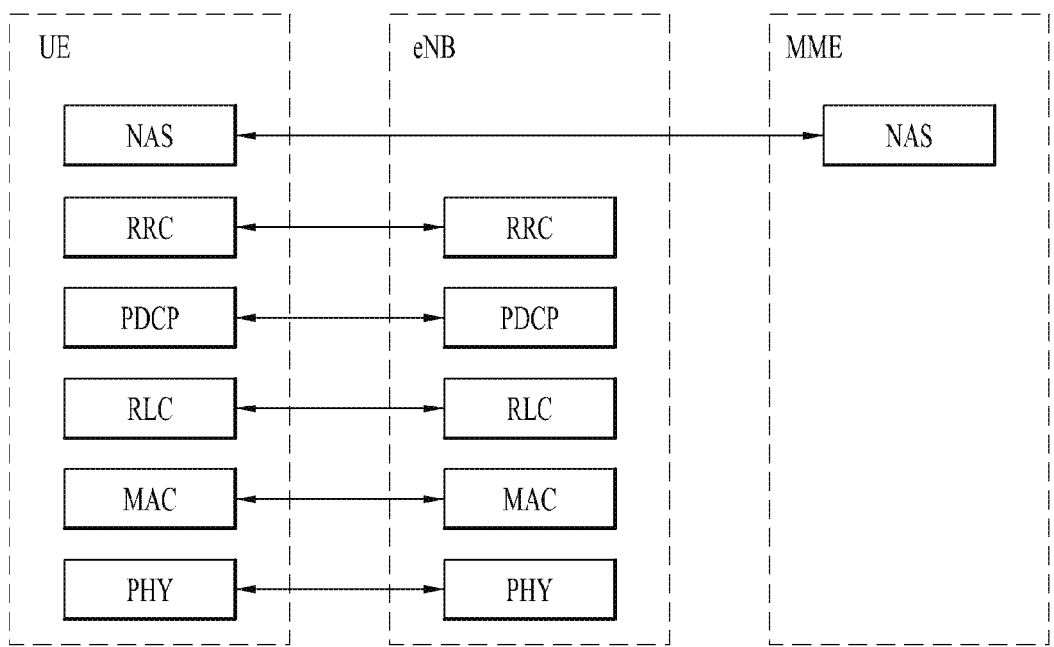
FIG. 4 is a diagram showing a control plane and a user plane of a radio interface protocol between a UE and an E-UTRAN based on a 3GPP radio access network standard.
Figure 4:
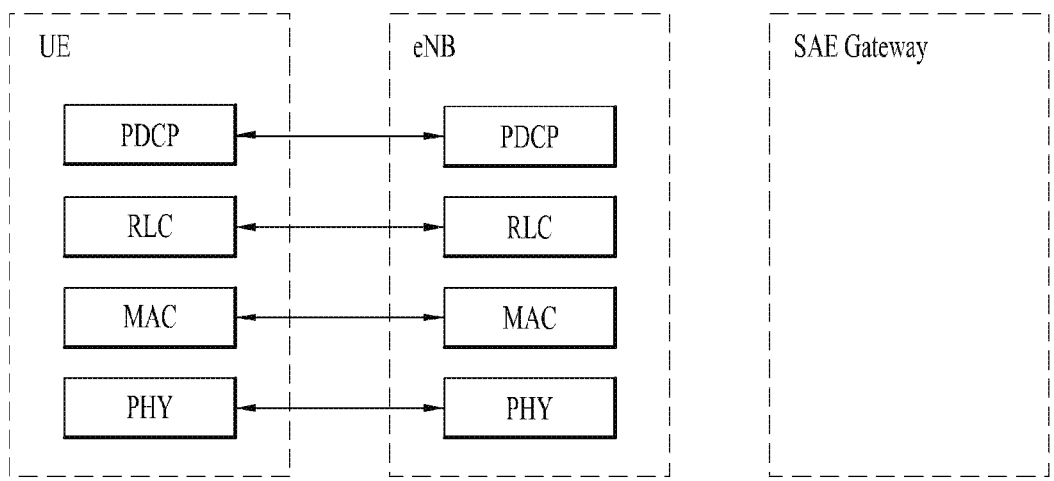

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
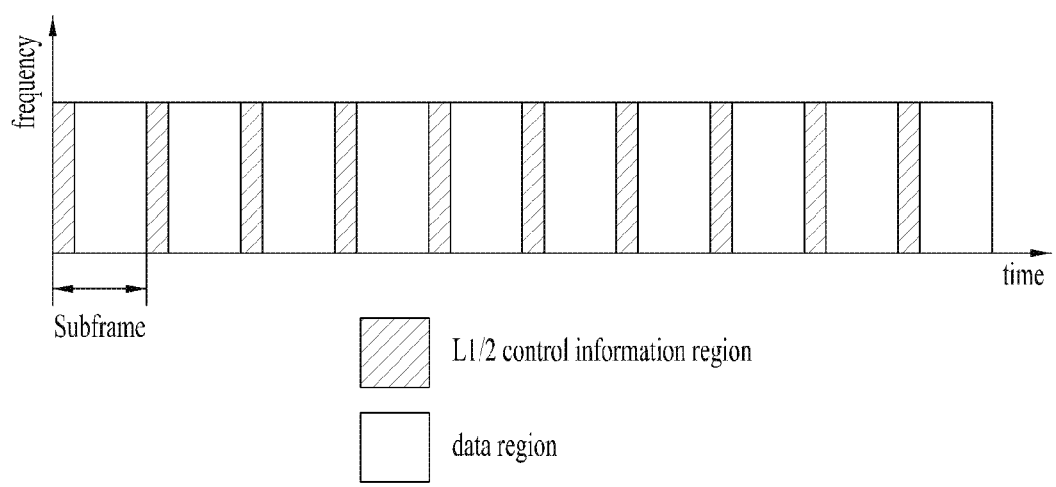
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of a UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to a certain RNTI means that the PDCCH is CRC-masked with the certain RNTI. A UE may attempt to decode a PDCCH using the certain RNTI if the UE is monitoring a PDCCH addressed to the certain RNTI.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID). The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

The random access procedure is also referred to as a random access channel (RACH) procedure. The random access procedure is common procedure for FDD and TDD, and one procedure irrespective of cell size and the number of serving cells when carrier aggregation (CA) is configured. The random access procedure is used for various purposes including initial access, adjustment of uplink synchronization, resource assignment, and handover. Random access procedures are classified into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible that multiple UEs transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without contention with other UEs.

Hereinafter, description will be given of the RRC state of the UE. If an RRC connection is established between the RRC layer of the UE and the RRC layer of a wireless network, the UE is in the RRC_CONNECTED state. Otherwise, the UE is in the RRC_IDLE state. The RRC state refers to a state in which the RRC of the UE is or is not logically connected with the RRC of the E-UTRAN. The RRC state of the UE having a logical connection with the RRC of the E-UTRAN is referred to as an RRC_CONNECTED state. The RRC state of the UE which does not have a logical connection with the RRC of the E-UTRAN is referred to as an RRC_IDLE state. A UE in RRC_CONNECTED has a RRC connection, and thus the E-UTRAN may recognize presence of the UE in a cell unit. Accordingly, the UE may be efficiently controlled. On the other hand, the E-UTRAN cannot recognize presence of a UE which is in RRC_IDLE. The UE in RRC_IDLE is managed by a core network in a tracking area (TA) which is an area unit larger than the cell. That is, for the UE in RRC_IDLE, only presence or absence of the UE is recognized in an area unit larger than the cell. In order for the UE in RRC_IDLE to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code, which is information broadcast from a cell. When the user initially turns on the UE, the UE searches for a proper cell first. Then, the UE establishes an RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish an RRC connection, does the UE establish an RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The RRC layer uses the RRC_IDLE state for PLMN selection, DRX configured by NAS, broadcast of system information, paging, cell re-selection. For a UE in RRC_IDLE, a UE specific DRX may be configured by NAS (not applicable for NB-IoT). The UE in RRC_IDLE can perform UE controlled mobility. The UE in RRC_IDLE monitors a paging channel to detect incoming calls, system information change, for earthquake and tsunami warning system (ETWS) capable UEs, ETWS notification, and for commercial mobility alert service (CMAS) capable UEs, CMAS notification, performs neighboring cell measurements and cell (re-)selection, acquires system information, performs logging of available measurements together with location and time for logged measurement configured UEs. No RRC context stored in the eNB (except for a UE that supports user plane CIoT EPS optimizations where a context may be stored for the resume procedure), sidelink communication transmission and reception, and/or sidelink discovery announcement and monitoring.

A UE in RRC_CONNECTED has an E-UTRAN-RRC connection and context in E-UTRAN. A UE in RRC_CONNECTED can perform network controlled mobility (handover and inter-RAT cell change order to GERAN with NACC), neighbor cell measurements. E-UTRAN knows the cell which the UE in RRC_CONNECTED belongs to, sidelink communication transmission and reception, and sidelink discovery announcement and monitoring. The network can transmit and/or receive data to/from the UE in RRC_CONNECTED. At PDCP/RLC/MAC level, the UE in RRC_CONNECTED can transmit and/or receive data to/from the network; monitors control signaling channel for shared data channel to see if any transmission over the shared data channel has been allocated to the UE; reports channel quality information and feedback information to the eNB. In RRC_CONNECTED, a DRX period can be configured according to the UE activity level for the UE power saving and efficient resource utilization under control of the eNB. The UE in RRC_CONNECTED monitors a paging channel and/or system information block type 1 contents to detect system information change, for ETWS capable UEs, ETWS notification, and for CMAS capable UEs, CMAS notification (not applicable for NB-IoT); monitors control channels associated with the shared data channel to determine if data is scheduled to it; provides channel quality and feedback information (not applicable for NB-IoT); performs neighboring cell measurements and measurements reporting (not applicable for NB-IoT); and acquires system information.

In order to enable reasonable UE battery consumption, DRX may be configured for in RRC_CONNECTED. Some characteristics in RRC_CONNECTED are as follows:

Available DRX values are controlled by the network and start from non-DRX up to 10.24 seconds;

Irrespective of DRX, a UE may use first available RACH opportunity to send a UL measurement report;

HARQ operation related to data transmission is independent of DRX operation and the UE wakes up to read the PDCCH for possible retransmissions and/or ACK/NAK signalling regardless of DRX. In the downlink, a timer is used to limit the time the UE stays awake awaiting for a retransmission. In the uplink, for asynchronous HARQ, a timer is used to limit the time the UE stays awake awaiting for a retransmission;

When DRX is configured, the UE may be further configured with an "on-duration" timer during which time the UE monitors the PDCCHs for possible allocations. The following definitions apply to DRX in RRC_CONNECTED, except for NB-IoT:

on-duration: duration in downlink subframes that the UE waits for, after waking up from DRX, to receive PDCCHs. If the UE successfully decodes a PDCCH, the UE stays awake and starts the inactivity timer;

inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions);

active-time: total duration that the UE is awake. This includes the "on-duration" of the DRX cycle, the time UE is performing continuous reception while the inactivity timer has not expired and the time UE is performing continuous reception while waiting for a DL retransmission after one HARQ RTT or, for asynchronous UL HARQ operation, for a UL retransmission grant after one UL HARQ RTT. Based on the above the minimum active time is of length equal to on-duration, and the maximum is undefined (infinite).

Of the above parameters the on-duration and inactivity-timer are of fixed lengths, while the active-time is of varying lengths based on scheduling decision and UE decoding success. Only on-duration and inactivity-timer duration are signaled to the UE by the eNB. There is only one DRX configuration applied in the UE at any time. The UE shall apply an on-duration on wake-up from DRX sleep. New transmissions can only take place during the active-time (so that when the UE is waiting for one retransmission only, it does not have to be "awake" during the RTT). If PDCCH has not been successfully decoded during the on-duration, the UE shall follow the DRX configuration (i.e. the UE can enter DRX sleep if allowed by the DRX configuration). Except for NB-IoT, if it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules: if a short DRX cycle is configured, the UE first follows the short DRX cycle and after a longer period of inactivity the UE follows the long DRX cycle; else the UE follows the long DRX cycle directly. A UE in RRC_CONNECTED may be configured with a long DRX (and a short DRX) through signaling dedicated to the UE.

Referring to 3GPP TS 36.304, a UE may use DRX in idle mode in order to reduce power consumption. UEs in idle mode monitor the PDCCH channel for P-RNTI used for paging to receive a paging message from an eNB. The UE needs to monitor the PDCCH only at certain UE specific paging occasion, i.e. only at specific subframe in specific radio frame. At other times, the UE may go to sleep mode to save battery power. One Paging Occasion (PO) is a subframe where there may be P-RNTI transmitted on PDCCH or MPDCCH or, for NB-IoT on NPDCCH addressing the paging message. In P-RNTI transmitted on MPDCCH case, PO refers to the starting subframe of MPDCCH repetitions. In case of P-RNTI transmitted on NPDCCH, PO refers to the starting subframe of NPDCCH repetitions unless subframe determined by PO is not a valid NB-IoT downlink subframe then the first valid NB-IoT downlink subframe after PO is the starting subframe of the NPDCCH repetitions. One Paging Frame (PF) is one Radio Frame, which may contain one or multiple Paging Occasion(s). When DRX is used the UE needs only to monitor one PO per DRX cycle. One Paging Narrowband (PNB) is one narrowband, on which the UE performs the paging message reception. PF, PO, and PNB are determined by following formulae using the DRX parameters provided in System Information. For example, IE RadioResourceConfigCommonSIB used to specify common radio resource configuration in the system information (e.g. system information block type 2) may include configuration information for paging channel (PCCH), and the configuration information for PCCH includes a paging cycle used to derive a DRX cycle 'T' of a UE.

PF is given by following equation: SFN mod T=(T div N)*(UE_ID mod N).

Index i_s pointing to PO from a subframe pattern defined in section 7.2 of 3GPP TS 36.304 will be derived from following calculation: i_s=floor(UE_ID/N) mod Ns.

If P-RNTI is monitored on MPDCCH, the PNB is determined by the following equation: PNB=floor(UE_ID/(N*Ns)) mod Nn.

System Information DRX parameters stored in the UE shall be updated locally in the UE whenever the DRX parameter values are changed in SI. If the UE has no IMSI, for instance when making an emergency call without USIM, the UE shall use as default identity UE_ID=0 in the PF, i_s, and PNB formulas above. The following Parameters are used for the calculation of the PF, i_s, and PNB:

T: DRX cycle of the UE. Except for NB-IoT, if a UE specific extended DRX value of 512 radio frames is configured by upper layers according to section 7.3 of 3GPP TS 36.304, T=512. Otherwise, T is determined by the shortest of the UE specific DRX value, if allocated by upper layers, and a default DRX value broadcast in system information. If UE specific DRX is not configured by upper layers, the default value is applied. UE specific DRX is not applicable for NB-IoT.

nB: 4T, 2T, T, T/2, T/4, T/8, T/16, T/32, T/64, T/128, and T/256, and for NB-IoT also T/512, and T/1024.

N: min(T,nB).

Ns: max(1,nB/T).

Nn: number of paging narrowbands provided in system information.

UE_ID: IMSI mod 1024, if P-RNTI is monitored on PDCCH; IMSI mod 4096, if P-RNTI is monitored on NPDCCH; IMSI mod 16384, if P-RNTI is monitored on MPDCCH. IMSI is given as sequence of digits of type Integer (0 . . . 9), IMSI shall in the formulae above be interpreted as a decimal integer number, where the first digit given in the sequence represents the highest order digit. For example: IMSI=12 (digit1=1, digit2=2). In the calculations, this shall be interpreted as the decimal integer "12", not "1×16+2=18".

The UE in idle mode may be configured by upper layers with an extended DRX (eDRX) cycle $T_{eDRX}$. The UE may operate in extended DRX only if the cell indicates support for eDRX in System Information. If the UE is configured with a $T_{eDRX}$ cycle of 512 radio frames, it monitors POs with parameter T=512. Otherwise, a UE configured with eDRX monitors POs (i.e, based on the upper layer configured DRX value and a default DRX value), during a periodic Paging Time Window (PTW) configured for the UE or until a paging message including the UE's NAS identity is received for the UE during the PTW, whichever is earlier. The PTW is UE-specific and is determined by a Paging Hyperframe (PH), a starting position within the PH (PTW_start) and an ending position (PTW_end). PH, PTW_start and PTW_end are given by the following formulae. The PH is the H-SFN satisfying the following equation: H-SFN mod $T_{eDRX,H}$= (UE_ID_H mod $T_{eDRX}$, where UE_ID_H is 10 most significant bits of the Hashed ID, if P-PRNTI is monitored on PDCCH or MPDCCH, and 12 most significant bits of the Hashed ID, if P-RNTI is monitored on NPDCCH; IMSI mod 1024; $T_{eDRX}$ is eDRX cycle of the UE in Hyper-frames, ($T_{eDRX}$=1, 2, . . . , 256 Hyper-frames) (for NB-IoT, $T_{eDRX,H}$=2, . . . , 1024 Hyper-frames) and configured by upper layers. PTW_start denotes the first radio frame of the PH that is part the PTW and has SFN satisfying the following equation: SFN=256*$i_{eDRX}$, where $i_{eDRX}$=floor (UE_ID_H/$T_{eDRX,H}$) mod 4. PTW_end is the last radio frame of the PTW and has SFN satisfying the following equation: SFN=(PTW_start+L*100−1) mod 1024, where L=Paging Time Window length (in seconds) configured by upper layers. Hashed ID is defined as follows: Hashed_ID is the Cyclic Redundancy Check value of $b_{31}$, $b_{30}$, . . . , $b_0$ of S-TMSI, computed according to CRC-32 algorithm in ITU-T Recommendation V.42 (03/2002) "Error-correcting procedures for DCEs using asynchronous-to-synchronous conversion", and S-TMSI=<$b_{39}$, $b_{38}$, . . . , $b_0$> as defined in 3GPP TS 23.003.

Figure 6:
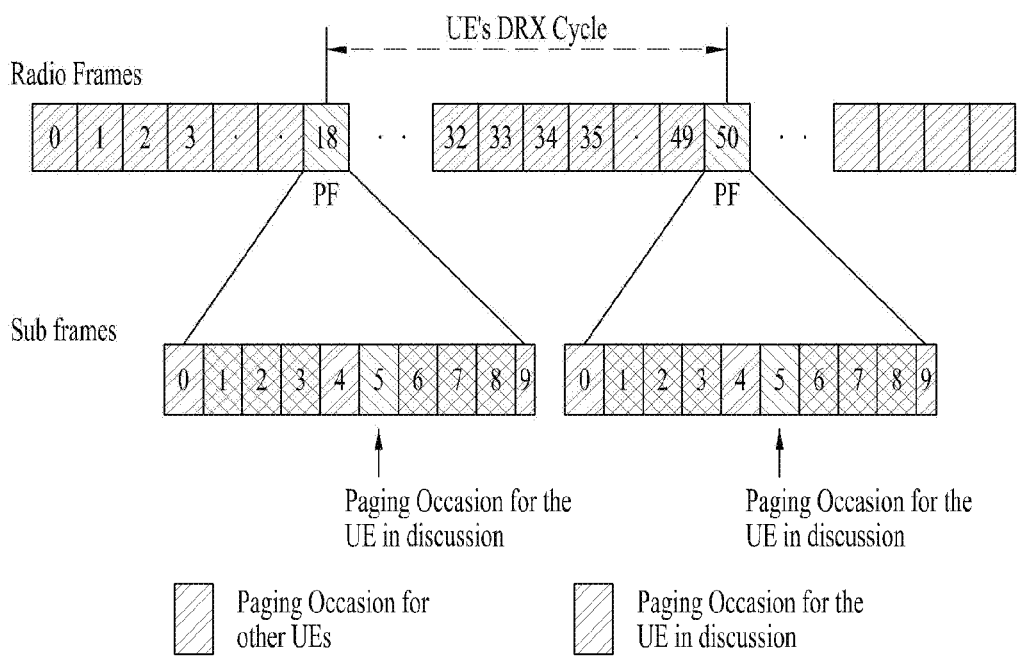
FIG. 6 is a diagram showing paging occasions used in the LTE system.

FIG. 6 is a diagram showing paging occasions used in the LTE system. Especially, FIG. 6 illustrates an example where the DRX cycle (i.e. paging DRX cycle) of the UE is 32 (i.e., T=32), the number of paging occasions within a paging cycle, i.e. DRX cycle across all users in the cell is 4T (i.e. Bn=4T), and UE_ID is 722. Referring to FIG. 6, every radio frame is a paging frame. 4 subframes per PF (Ns=4) are used for paging within the paging DRX cycle. According to the pre-defined pattern for FDD for Ns=4, subframes 0, 4, 5 and 9 used for paging in a paging frame and paging opportunity for the UE is subframe 5. 32 paging frames and 128 paging occasions (nB=128) are available within UE's DRX cycle across which UEs are distributed based on the UE identity.

Figure 7:
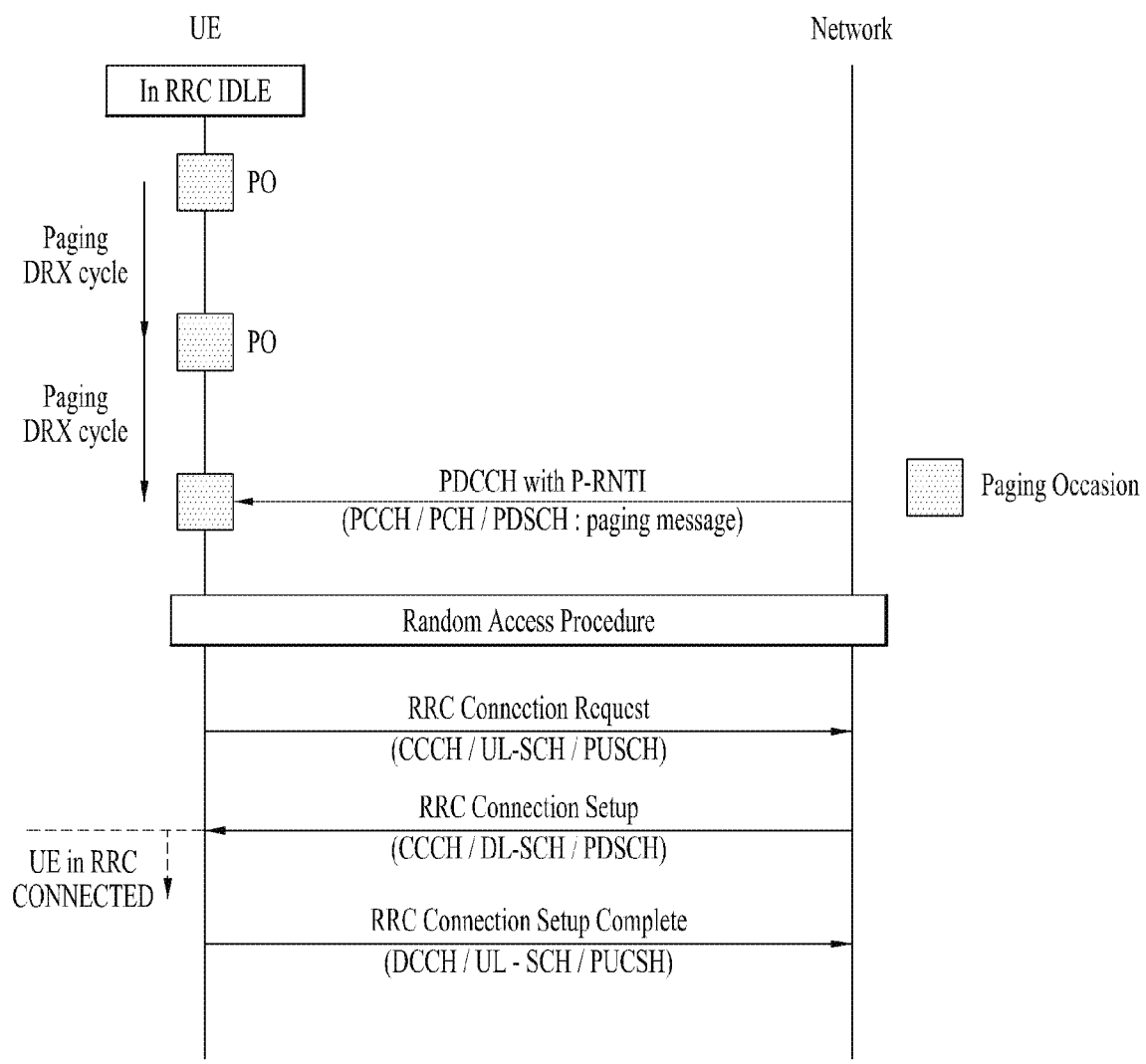
FIG. 7 is a flow diagram showing the LTE paging procedure.

FIG. 7 is a flow diagram showing the LTE paging procedure. The purpose of the paging procedure is to transmit paging information to a UE in RRC_IDLE and/or; to inform UEs in RRC_IDLE and UEs other than NB-IoT UEs in RRC_CONNECTED about a system information change and/or; to inform UEs other than NB-IoT UEs about an ETWS primary notification and/or ETWS secondary notification and/or; to inform UEs other than NB-IoT UEs about a CMAS notification and/or; to inform UEs other than NB-IoT UEs in RRC_IDLE about an EAB parameters modification and/or; to inform UEs other than NB-IoT UEs in RRC_IDLE to perform E-UTRAN inter-frequency redistribution procedure. The paging information is provided to upper layers, which in response may initiate RRC connection establishment, e.g., to receive an incoming call.

The mobility management entity (MME) is responsible for the initiation of LTE paging procedure. The MME does this by forwarding a S1AP paging message to one or more eNBs. The LTE paging procedure is applicable to a UE in ECM IDLE State. The UEs in ECM_IDLE are in RRC IDLE mode and do not have S1 connectivity with the MME. The location of a UE in ECM IDLE is known by the MME on a per tracking area basis. The MME has to forward a S1AP paging message to all eNB(s) within the relevant tracking area. The MME forward paging message to multiple eNBs as UE(s) can be registered with more than a single tracking area. The MME starts timer T3413 after sending a S1AP paging message for PS data call. The eNB receives the S1AP paging message from the MME and constructs a RRC paging message. Single RRC can carry information from multiple S1AP. The paging message can include multiple paging records to page multiple UE. A UE in RRC_IDLE checks for paging once every DRX cycle. Paging occasion within the paging frame defines specific subframe during which a LTE UE checks for paging message. The UE searches for P-RNTI within a PDCCH of a subframe belonging to paging occasion. P-RNTI indicates that the UE may have a paging message on a PDSCH. The UE finds P-RNTI in the PDCCH, it will decode resource allocation information. The UE decodes a RRC message from the PDSCH and checks a UE identity in all the records. If the UE do not find its identity in paging record then it will return to check PDCCH for P-RNTI at each of the paging occasions. If the UE find its identity, it will trigger a random access procedure to establish a RRC connection. The UE sends a RRC connection request message and the eNB responds with a RRC connection setup message. If the LTE paging procedure is for PS data call, the UE includes a service request NAS message within the RRC connection setup complete message. If the paging procedure is for a terminating CS fallback call, UE includes an extended service request NAS message within a RRC connection setup complete message. The eNB forwards a NAS message to the MME which will stop T3413 if it is running and will proceed to establish connection with UE. A paging retransmission will be triggered if T3413 gets expire prior to the MME receiving a NAS message from a UE.

Figure 8:
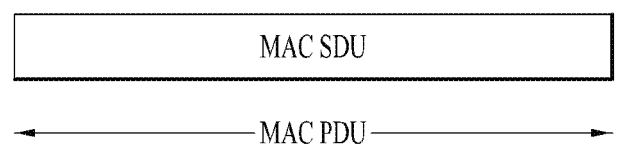
FIG. 8 shows an example of a medium access control (MAC) protocol data unit (PDU).

FIG. 8 shows an example of a medium access control (MAC) protocol data unit (PDU). The MAC PDU used for PCH in the LTE/LTE-A system consists solely of a MAC service data unit (SDU) whose size is aligned to a TB. The MAC PDU structure shown in FIG. 8 is used for transmission on PCH, BCH, DL-SCH including BCCH, BR-BCCH, SL-DCH and SL-BCH.

When a MAC entity of a UE needs to receive a paging channel (PCH), the MAC entity attempts to decode a TB on the PCH as indicated by the PDCCH information if a PCH assignment has been received on the PDCCH for the P-RNTI, and deliver the decoded MAC PDU to upper layers if a TB on the PCH has been successfully decoded.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) System (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

Figure 9:
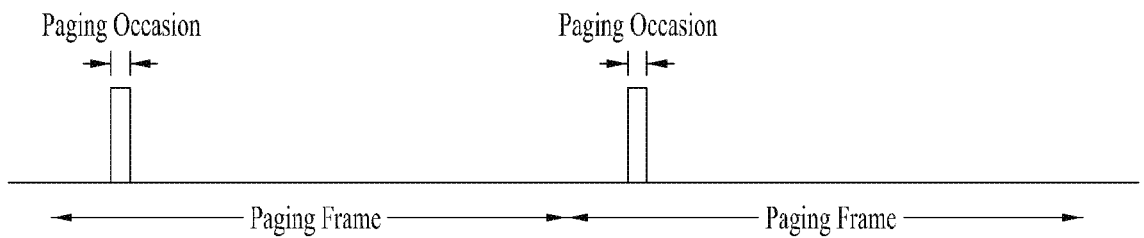
FIG. 9 is another diagram showing paging occasions used in the LTE system.

FIG. 9 is another diagram showing paging occasions used in the LTE system.

As mentioned above, the DRX mechanism in LTE is used for power saving for the UE in RRC_IDLE. In the LTE RRC_IDLE, the UE monitors a PDCCH addressed to P-RNTI on a Paging Occasion (PO) (which is called Paging DRX). The PO is defined per Paging Frame (PF). The PO and PF are derived by the UE based on the UE ID. When the UE detects a PDCCH on a Paging Occasion, the UE decodes the paging message received on the PCH as indicated by the PDCCH information. The paging message contains various information including UE identity information. Based on the UE identity information, the UE can decide whether the paging message is targeted for it or not. In the legacy LTE/LTE-A system, if the UE identity included in the paging message matches with its identity, the UE initiates a random access procedure to make a RRC connection.

In 5G New RAT, a new state, called RRC_INACTIVE, is introduced in addition to RRC_IDLE and RRC_CONNECTED. The benefit of keeping UE in RRC_INACTIVE is as follows:
- as the UE context is stored in the radio access network (RAN), the core network (CN) signaling could be reduced when RRC connection is established;
- as the UE is tracked in RAN level, the paging overhead could be reduced;
- as the UE is configured with DRX similar to RRC_IDLE, the UE power consumption could be reduced.

The RRC_INACTIVE state is characterized as follows: cell re-selection mobility; CN-NR RAN connection (both C/U-planes) that is a connection between a core network and a NR RAN (i.e. gNB) has been established for UE; the UE AS context is stored in at least one gNB and the UE; paging is initiated by a NR RAN; RAN-based paging area is managed by a NR RAN; and/or a NR RAN knows the RAN-based paging area which the UE belongs to.

In RRC_INACTIVE, whether to allow DL data transmission is currently under discussion. To fully enjoy the benefit of the RRC_INACTIVE, however, it is required that the UE should be able to transmit or receive data in the RRC_INACTIVE state without state transition to the RRC_CONNECTED state. The state transition to RRC_CONNECTED requires couple of handshakes of RRC messages, which consumes much radio resource and UE power. Moreover, if the UE is kept in RRC_CONNECTED, the UE consumes more power than RRC_INACTIVE because the connected mode DRX is less power efficient than idle (or inactive) mode DRX. Considering that paging occasion is sparse for battery saving and is not dedicated for a specific UE, a new mechanism seems to be required for the UE in RRC_INACTIVE (and even in RRC_IDLE) to monitor PDCCH for downlink data reception.

In the RRC_INACTIVE state, the location of a UE is known at the RAN based area level where that area may be a single cell or more than one cell, meaning that the exact location of the UE may not be known in case where the area is determined as multiple cells. Therefore, it seems inevitable that the UE always starts from paging reception for downlink data reception. Then, the new mechanism needs to make the UE receive downlink data at least after the UE's location is known to the network though the paging procedure. Several methods have been proposed so far, which are summarized below.

(1) Data transmission with paging message: DL data is included in a paging message, or transmitted together with the paging message. This method requires the transmission of DL data in every cell within the RAN, which causes severe radio resource wastage.

(2) Data transmission during random access (RA) procedure: The UE initiates an RA procedure after receiving a paging message, and the UE receives DL data in Msg4 during the RA procedure. This method requires the UE to initiate an RA procedure, which causes large delay before receiving DL data.

(3) Data transmission on DL shared channel: DL data is transmitted on the DL shared channel, and the UE is configured with connected mode DRX to monitor PDCCH for the DL shared channel. The connected mode DRX is not good for battery saving compared with idle mode DRX since the cycle of the connected mode DRX would be shorter than that of the idle mode DRX, and it goes contrary to the purpose of RRC_INACTIVE state.

(4) Data transmission after identifying UE location at cell level: The network initiates a RAN-based paging in a radio network area. The paging message may assign a reserved preamble used for a paging response. If a UE responses using the reserved preamble in a cell, the network transmits DL data only in the cell where the UE is located. This method is useful when the UE location is not known at a cell level since the DL data is transmitted after the UE location is specified at a cell level. This method increases UE collision probability during a RA procedure, since RA preamble(s) have to be reserved for the paging response purpose and remaining preambles only can be used for other purpose.

As all methods stated above have drawbacks, a new method having the reduced radio resource wastage, the reduced delay and the better battery saving and not increasing RA collision probability needs to be considered.

DL data transmission could be triggered by UL data transmission as feedback to UL data or without previous UL data transmission. If DL data transmission is triggered without previous UL transmission, a paging message may trigger downlink transmission in RRC_INACTIVE because UE periodically monitors the paging message while the UE is in RRC_INACTIVE. In the present invention, a UE in RRC_INACTIVE receives a UL grant included in a paging message, and transmits a paging feedback on the UL grant. After transmitting the paging feedback, the UE monitors a PDCCH to receive DL data. By the present invention, the UE can maintain the paging DRX to save battery in RRC_INACTIVE, and if DL data occurs, the UE can receive DL data reliably without large delay.

A UE is configured with a paging DRX by a network, where the paging DRX includes Paging Occasion (PO) and Paging Frame (PF). In RRC_INACTIVE, the UE is configured with a paging DRX, and monitors a PDCCH addressed to P-RNTI only on paging occasions. In other words, a paging DRX to be used in RRC_INACTIVE is configured to the UE, and the UE in RRC_INACTIVE operates in the paging DRX and monitors a PDCCH addressed to P-RNTI only on paging occasions. When the UE receives a PDCCH addressed to P-RNTI on a paging occasion from an eNB or gNB, the UE decodes a PCH associated with the PDCCH to get the paging message.

The paging message includes an UE identity, i.e., UE ID, (e.g. TMSI or IMSI) that the paging message targets for. The UE ID is unique to the UE, and would not vary as the UE moves across cells.

Since a paging message would be also used to trigger an area update procedure for state transition of a UE to RRC_ACTIVE (e.g. RRC_CONNECTED), the paging message should be able to indicate either downlink transmission in RRC_INACTIVE or state transition to RRC_ACTIVE for a UE to receive downlink transmission in RRC_ACTIVE. In the present invention, the paging message may include an indication that the purpose of the paging message is DL data transmission. The paging message indicating downlink transmission in RRC_INACTIVE could inform UE about scheduling of downlink transmission so that UE in RRC_INACTIVE receives downlink transmission according to the scheduling information.

If a UE is in RRC_INACTIVE, an eNB or gNB can determine whether downlink data is transmitted in RRC_INACTIVE (i.e. without state transition) or after state transition to RRC_ACTIVE. The UE in RRC_INACTIVE would periodically monitor a paging message in a certain time interval i.e. paging occasion(s). In the present invention, the paging message indicating downlink transmission triggers uplink transmission with a UE Identity. When the UE receives a paging message from an eNB or gNB, and if the UE recognizes that the paging message is for DL data transmission, the UE does not initiate an RA procedure but transmits a paging feedback (indicating paging message reception) on the UL grant included in the paging message to the eNB or gNB. If the UL grant is provided using the paging message, there is no worry about collision problem since the UL grant is dedicated for the UE, and the paging feedback can be reliably transmitted. An explicit indication may be used to indicate that the paging message is for DL data transmission. In another alternative example, a UL grant in a paging message may implicitly indicate that the paging message is for DL data transmission.

The UL grant for paging feedback may not be included in the paging message, but configured by system Information or dedicated RRC signaling. In another words, the UL grant for the paging feedback purpose may be pre-configured by using system information (of a cell on which the UE is camping on) or by dedicated RRC signaling during the UE is in RRC_CONNECTED. In this case, the UL grant may be associated with a Paging Occasion, and the UE can get the UL grant implicitly by which Paging Occasion the UE receives the paging message from.

The UL grant for paging feedback may span on multiple subframes. In this case, the UE may transmit a paging feedback to the eNB or gNB on only one subframe of the multiple, or all of the multiple subframes (e.g. each of the multiple subframes), or part of the multiple subframes. The UE may transmit the paging feedback to the eNB or gNB until the UE receives an ACK for the paging feedback or a timer associated with the paging feedback expires.

The paging feedback may be transmitted in the form of MAC Control Element (hereinafter, paging feedback MAC CE). A logical channel ID (LCID) may be allocated for the paging feedback MAC CE. The paging feedback MAC CE may be identified by a MAC PDU subheader with the LCID allocated for the paging feedback MAC CE. The paging feedback MAC CE may consist only of MAC subheader. In other words, the paging feedback MAC CE may consist of a MAC subheader but no payload. In another alternative, the paging feedback MAC CE may include the UE ID.

Figure 10:
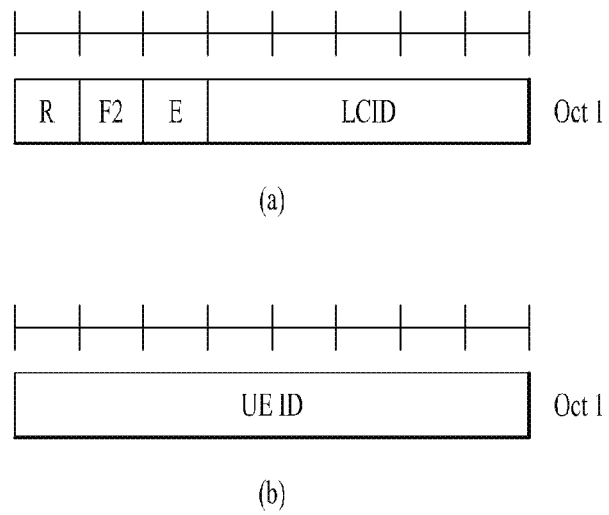
FIG. 10 illustrates an example of a medium access control (MAC) control element (CE) structure for paging feedback.

FIG. 10 illustrates an example of a medium access control (MAC) control element (CE) structure for paging feedback. Especially, FIG. 10(a) illustrates an example of a MAC subheader available for the paging feedback MAC CE, and FIG. 10(b) illustrates an example of a MAC CE field. As mentioned above, the paging feedback MAC CE may consist of the MAC subheader only (and no MAC CE field). Alternatively, the paging feedback or may consist of the MAC subheader and the MAC CE field. The MAC CE field may contain a UE ID of the UE that transmits a corresponding MAC CE.

After transmitting the paging feedback to the eNB or gNB, the UE monitors a PDCCH addressed to a UE-dedicated RNTI (e.g. C-RNTI, or inactive RNTI (I-RNTI)). If no PDCCH addressed to the UE-dedicated RNTI (e.g. C-RNTI or I-RNTI) is received within a configured time, the UE may transmit the paging feedback again to the eNB or gNB.

The UE may also monitor a PDCCH addressed to P-RNTI on Paging Occasions until a PDCCH addressed to UE-dedicated RNTI (e.g. C-RNTI or I-RNTI) is received. It is because the paging feedback could not arrive at the network successfully and/or new paging can occur while the UE monitor a PDCCP addressed to the UE-dedicated RNTI.

The UE is configured with a DRX for RRC_INACTIVE, i.e., INACTIVE_DRX, by the network. The UE may monitor a PDCCH addressed to UE-dedicated RNTI (e.g. C-RNTI or I-RNTI) discontinuously based on an INACTIVE_DRX configuration. The INACTIVE_DRX configuration may be provided by system information or dedicated RRC signaling. The UE may receive the INACTIVE_DRX configuration via the dedicated signaling while the UE is in RRC CONNECTED. The INACTIVE_DRX configuration may include: at least DRX cycle and/or On Duration. The DRX cycle for RRC_INACTIVE may be shorter than the DRX cycle used in the paging DRX.

When the UE receives a PDCCH addressed to UE-dedicated RNTI (e.g. C-RNTI or I-RNTI), the UE decodes the PDSCH associated with the PDCCH. If there is an indication in the PDSCH that more DL data is waiting for transmission, the UE keeps monitoring a PDCCH addressed to the UE-dedicated RNTI (e.g. C-RNTI or I-RNTI). If there is an indication in the PDSCH that no more DL data is waiting for transmission, the UE stops monitoring a PDCCH addressed to the UE-dedicated RNTI (e.g. C-RNTI or I-RNTI), and goes back to the paging DRX. The indication in the PDSCH may be in the form of MAC Control Element, and an LCID may be allocated for that MAC CE. The MAC CE for the indication that there is more DL data for transmission may be identified by a MAC PDU subheader with the LCID allocated for the MAC CE.

Figure 11:
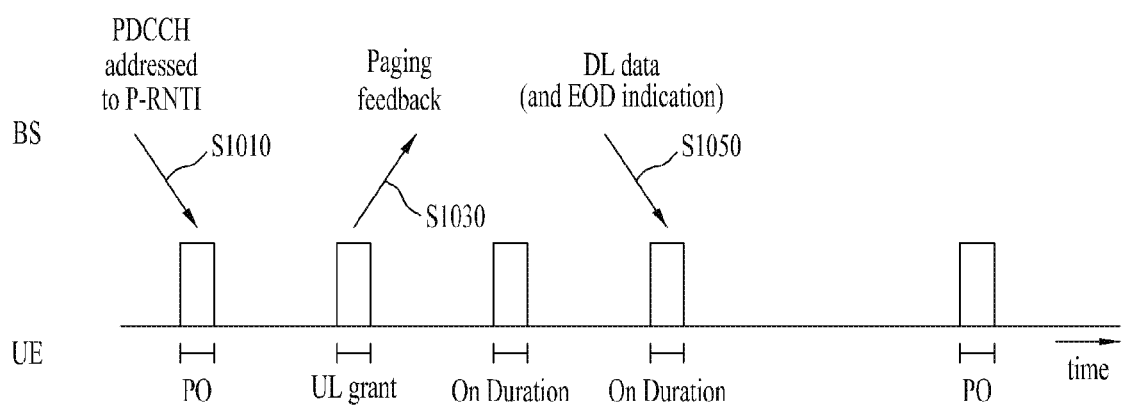
FIG. 11 illustrates an example of a downlink data reception procedure at a user equipment, when the UE is not in RRC_CONNECTED, according to the present invention.

FIG. 11 illustrates an example of a downlink data reception procedure at a user equipment, when the UE is not in RRC_CONNECTED, according to the present invention.

The UE in RRC_INACTIVE is configured with a paging DRX (i.e. PF and PO), and monitors a PDCCH addressed to P-RNTI on every Paging Occasion.

If the UE receives a PDCCH addressed to the P-RNTI on a Paging Occasion, the UE decodes a transport block on a PCH, and gets a paging message (S1010).

If the UE identity included in the paging message is equal to its identity, the UE considers that the paging message is targeted for it. The UE may further check whether the paging message includes an indication that the purpose of the paging message is DL data transmission.

If the paging message is for DL data transmission, the UE constructs a paging feedback MAC CE, and transmits it using a UL grant configured for paging feedback purpose (S1030). The UL grant may be included in the paging message or pre-configured by system information or dedicates signaling.

The UE monitors a PDCCH addressed to UE-dedicated RNTI (e.g. C-RNTI or I-RNTI) on On Duration(s) of INACTIVE_DRX. The UE may also monitor a PDCCH addressed to P-RNTI on Paging Occasions according to a paging DRX until a PDCCH addressed to UE-dedicated RNTI (e.g. C-RNTI or I-RNTI) is received. If the UE receives a PDCCH addressed to the UE-dedicated RNTI (e.g. C-RNTI or I-RNTI) on an On Duration of INACTIVE_DRX, the UE receives a PDSCH associated with the PDCCH and decodes a transport block on DL-SCH, and gets the DL data (S1050). If the DL data or the PDSCH includes an "End of Data" (EOD) indication, the UE stops monitoring a PDCCH addressed to UE-dedicated RNTI (e.g. C-RNTI or I-RNTI), and goes back to the paging DRX. If the DL data or the PDSCH includes a "More Data" indication or does not include "End of Data" indication, the UE keeps monitoring a PDCCH addressed to the UE-dedicated RNTI (e.g. C-RNTI or I-RNTI) on On Duration(s) of INACTIVE_DRX.

The present invention explained above may also apply to UEs in RRC_IDLE as well as UEs in RRC_INACTIVE.

Figure 12:
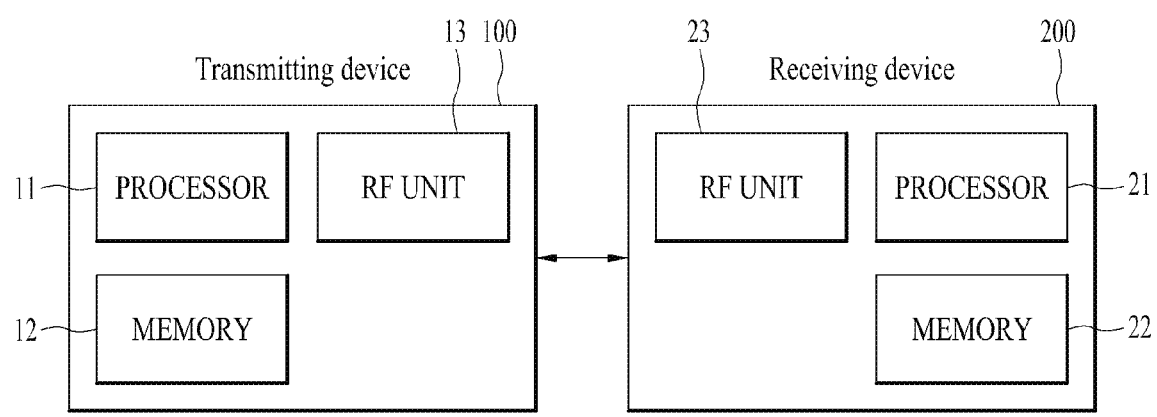
FIG. 12 is a block diagram illustrating elements of a transmitting device 100 and a receiving device 200 for implementing the present invention.

FIG. 12 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may control the eNB RF unit to transmit paging DRX configuration information. The UE processor may monitor a paging message on paging occasion(s) according to the paging DRX configuration information. The UE processor may control the UE RF unit to receive a paging message on paging occasion(s) based on the paging DRX configuration information. If the UE RF unit receives a paging message associated with downlink (DL) data, the UE processor may control the UE RF unit to transmit a paging feedback using a uplink (UL) grant associated with the paging message. The paging message may include an indication that the paging message is for DL data transmission. The UL grant may be included in the paging message, or pre-configured by system information. After transmitting the paging feedback, the UE processor may monitor a physical downlink control channel (PDCCH) to receive the DL data. The UE processor may be configured to transmit the paging feedback using the UL grant if the UE RF unit receives the paging message while the UE is in RRC_INACTIVE. The paging message may include a UE identity that the paging message targets for. The UE processor may control the RF unit to transmit the paging feedback if the UE identity is the same as that of the UE. The UE processor may control the UE RF unit to the paging feedback using a MAC CE. The MAC CE for the paging feedback may consists of a MAC subheader and no MAC CE field, or consist of the MAC subheader and a MAC CE field. The MAC CE field may contain the UE identity. The UE processor may monitor the PDCCH addressed to a UE-dedicated RNTI after transmitting the paging feedback. The UE-dedicated RNTI may be a C-RNTI. The UE-RNTI may be an I-RNTI configured or allocated for RRC_INACTIVE. The eNB processor may control the eNB RF unit to further transmit INACTIVE_DRX configuration information to a UE. The UE processor may monitor the PDCCH addressed to the C-RNTI using an INACTIVE_DRX according to the INACTIVE_DRX configuration after transmitting the paging feedback. For example, the UE processor may be configured to monitor the PDCCH addressed to the UE-dedicated RNTI on On Duration(s) according to the INACTIVE_DRX configuration. The UE processor may control the UE RF unit to transmit the paging feedback without initiating a random access procedure.

The UE processor may control the UE RF unit to receive a physical downlink shared channel (PDSCH) associated with the PDCCH addressed to a UE-dedicated RNTI, where the PDSCH carries the DL data. The UE processor may monitor a further PDCCH addressed to the UE-dedicated RNTI if the PDSCH includes an indication that more DL data is waiting for transmission. The UE processor may go back to a paging DRX if the PDSCH includes an indication that no more DL data is waiting for transmission.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a network node (e.g., BS), a UE, or other devices in a wireless communication system.

What is claimed are:

1. A method for receiving, by a user equipment (UE) in radio resource control INACTIVE (RRC_INACTIVE), downlink signals in a wireless communication system, the method comprising:
receiving, by the UE, a paging message associated with downlink (DL) data, wherein an uplink (UL) grant associated with the paging message is pre-configured and spans multiple subframes;
transmitting, by the UE, a paging feedback message on at least one of the multiple subframes related to the UL grant without initiating a random access procedure; and
monitoring, by the UE, a physical downlink control channel (PDCCH) to receive the DL data based on transmitting the paging feedback message, while maintaining the RRC_INACTIVE.

2. The method according to claim 1,
wherein the UE transmits the paging feedback message based on the paging message including a UE identity identical to that of the UE.

3. The method according to claim 1,
wherein the paging feedback message is transmitted in a medium access control (MAC) control element.

4. The method according to claim 1,
wherein the UE monitors the PDCCH addressed to a UE-dedicated radio network temporary identifier (RNTI).

5. The method according to claim 4,
wherein the UE monitors the PDCCH addressed to the UE-dedicated RNTI using an inactive discontinuous reception (DRX).

6. The method according to claim 1,
receiving, by the UE, a physical downlink shared channel (PDSCH) associated with the PDCCH addressed to a UE-dedicated radio network temporary identifier (RNTI), the PDSCH carrying the DL data;
monitoring, by the UE, a further PDCCH addressed to the UE-dedicated RNTI based on the PDSCH including an indication that more DL data is waiting for transmission; and
going, by the UE, back to a paging discontinuous reception (DRX) based on the PDSCH including an indication that no more DL data is waiting for transmission.

7. The method according to claim 1,
wherein the paging message includes an indication that the paging message is for DL data transmission.

8. A user equipment (UE) for receiving downlink signals in a wireless communication system, wherein the UE is in radio resource control INACTIVE (RRC_INACTIVE), the UE comprising:
a transceiver;
a processor; and
a memory that is operably connectable to the processor and that has stored thereon instructions which, when executed, cause the processor to perform operations comprising:
receiving, via the transceiver, a paging message associated with downlink (DL) data, wherein an uplink (UL) grant associated with the paging message is pre-configured and spans multiple subframes;
transmitting, via the transceiver, a paging feedback message on at least one of the multiple subframes related to the UL grant without initiating a random access procedure; and
monitoring a physical downlink control channel (PDCCH) to receive the DL data based on transmitting the paging feedback message, while maintaining the RRC_INACTIVE.

9. The UE according to claim 8,
wherein transmitting the paging feedback message comprises transmitting the paging feedback message based on the paging message including a UE identity identical to that of the UE.

10. The UE according to claim 8,
wherein the paging feedback message is transmitted in a medium access control (MAC) control element.

11. The UE according to claim 8,
wherein monitoring the PDCCH comprises monitoring the PDCCH addressed to a UE-dedicated radio network temporary identifier (RNTI).

12. The UE according to claim 11,
wherein monitoring the PDCCH comprises monitoring the PDCCH addressed to the UE-dedicated RNTI using an inactive discontinuous reception (DRX).

13. The UE according to claim 8,
wherein the operations further comprise:
receiving, via the transceiver, a physical downlink shared channel (PDSCH) associated with the PDCCH addressed to a UE-dedicated radio network temporary identifier (RNTI), the PDSCH carrying the DL data;
monitoring a further PDCCH addressed to the UE-dedicated RNTI based on the PDSCH including an indication that more DL data is waiting for transmission; and
going back to a paging discontinuous reception (DRX) based on the PDSCH including an indication that no more DL data is waiting for transmission.

14. The UE according to claim 8,
wherein the paging message includes an indication that the paging message is for DL data transmission.

15. A method for receiving, by a user equipment (UE) in radio resource control INACTIVE (RRC_INACTIVE), downlink signals in a wireless communication system, the method comprising:
receiving, by the UE, a paging message associated with downlink (DL) data, wherein an uplink (UL) grant associated with the paging message is included in the paging message;
transmitting, by the UE, a paging feedback message on the UL grant without initiating a random access procedure; and
monitoring, by the UE, a physical downlink control channel (PDCCH) to receive the DL data based on transmitting the paging feedback message, while maintaining the RRC_INACTIVE.

16. A user equipment (UE) for receiving downlink signals in a wireless communication system, wherein the UE is in radio resource control INACTIVE (RRC_INACTIVE), the UE comprising:
a transceiver;
a processor; and
a memory that is operably connectable to the processor and that has stored thereon instructions which, when executed, cause the processor to perform operations comprising:
receiving, by the transceiver, a paging message associated with downlink (DL) data, wherein an uplink (UL) grant associated with the paging message is included in the paging message;

transmitting, by the transceiver, a paging feedback message on the UL grant without initiating a random access procedure; and monitoring, by the transceiver, a physical downlink control channel (PDCCH) to receive the DL data based on transmitting the paging feedback message, while maintaining the RRC_INACTIVE.

* * * * *